(12) United States Patent
Suzuki

(10) Patent No.: US 10,157,299 B2
(45) Date of Patent: Dec. 18, 2018

(54) CONNECTION UNIT, INFORMATION-PROCESSING DEVICE

(71) Applicant: Asterisk, Inc., Osaka-shi, Osaka (JP)

(72) Inventor: Noriyuki Suzuki, Osaka (JP)

(73) Assignee: ASTERISK, INC., Osaka (JP)

( * ) Notice: Subject to any disclaimer, the term of this patent is extended or adjusted under 35 U.S.C. 154(b) by 0 days.

(21) Appl. No.: 15/575,034

(22) PCT Filed: Mar. 16, 2017

(86) PCT No.: PCT/JP2017/010564
§ 371 (c)(1),
(2) Date: Nov. 17, 2017

(87) PCT Pub. No.: WO2017/164049
PCT Pub. Date: Sep. 28, 2017

(65) Prior Publication Data
US 2018/0150665 A1  May 31, 2018

(30) Foreign Application Priority Data

Mar. 23, 2016  (JP) .................................. 2016-059196

(51) Int. Cl.
*G06K 7/10* (2006.01)
*H01R 13/629* (2006.01)
(Continued)

(52) U.S. Cl.
CPC ........... *G06K 7/10386* (2013.01); *G06K 7/10* (2013.01); *H01R 13/6205* (2013.01);
(Continued)

(58) Field of Classification Search
CPC ........... G06K 7/10386; G06K 7/10237; G06K 7/10762; G06K 7/10881; H01R 13/629; H01R 13/6205
See application file for complete search history.

(56) References Cited

U.S. PATENT DOCUMENTS

2010/0195279 A1* 8/2010 Michael ................ G06F 1/1632
361/679.41
2013/0273752 A1* 10/2013 Rudisill ............. H01R 13/6205
439/39
(Continued)

FOREIGN PATENT DOCUMENTS

JP    11-252268 A    9/1999
JP    2014-096128 A  5/2014

OTHER PUBLICATIONS

International Search Report of the corresponding International Application No. PCT/JP2017/010564, dated May 16, 2017.

*Primary Examiner* — Laura Gudorf
(74) *Attorney, Agent, or Firm* — Global IP Counselors, LLP

(57) ABSTRACT

A mobile connection unit, configured to connect a mobile terminal having a first terminal with a mobile reading unit having a second terminal and configured to read data from an information medium, includes a main body, a first terminal portion, a second terminal portion, and an electrical pathway. The main body is attached to the mobile terminal, and the reading unit is attached to and detached from the main body. The first terminal portion is disposed at the main body, and contacts the first terminal of the mobile terminal for electrical connection with the mobile terminal. The second terminal portion is disposed at the main body, and contacts the second terminal of the reading unit for electrical connection with the reading unit. The electrical pathway is disposed between the first terminal portion and the second terminal portion to connect the mobile terminal and the reading unit.

6 Claims, 10 Drawing Sheets

(51) Int. Cl.
*H01R 13/62* (2006.01)
*H04M 1/21* (2006.01)

(52) U.S. Cl.
CPC ............ *H01R 13/629* (2013.01); *H04M 1/21* (2013.01); *G06K 7/10237* (2013.01); *G06K 7/10762* (2013.01); *G06K 7/10881* (2013.01)

(56) References Cited

U.S. PATENT DOCUMENTS

2015/0241931 A1* 8/2015 Carnevali ............... G06F 1/181
 361/679.41
2016/0211889 A1* 7/2016 Bosscher ............. H01R 13/665
2016/0365185 A1* 12/2016 Bengtsson .............. H01F 7/064

* cited by examiner

CONNECTION UNIT, INFORMATION-PROCESSING DEVICE

CROSS-REFERENCE TO RELATED APPLICATION

This application is a U.S. National stage application of International application No. PCT/JP2017/010564, filed on Mar. 16, 2017, which claims priority to Japanese Patent Application No. 2016-059196 filed on Mar. 23, 2016. The entire disclosure of Japanese Patent Application No. 2016-059196 is incorporated by reference herein.

BACKGROUND

Field of the Invention

The present invention relates to a connection unit configured to connect a mobile terminal and a reading unit to read data from an information medium, and relates to an information-processing device including the connection unit.

Background Information

Japanese Patent Application Publication No. 2014-96128, for example, describes a system configured to read data in the form of a two-dimensional code (information medium), such as a barcode or a QR code (registered trademark) by a reader, and transmit the data to a mobile information-processing terminal (hereinafter called "mobile terminal"), such as a smartphone or a tablet.

The system described in Japanese Patent Application Publication No. 2014-96128 includes: the mobile terminal; the reading unit, such as a barcode reader or an IC card reader; and a modular sled intervening between the mobile terminal and the reading unit. The modular sled is configured to receive data read by the reading unit in a wireless manner and to transmit the data to the mobile terminal in a wired or wireless manner. This modular sled functions as a mobile holder as well to integrally hold the mobile terminal and the reading unit.

SUMMARY

However, when the system described in Japanese Patent Application Publication No. 2014-96128 is used in the environment receiving weak radio waves, the modular sled may fail to receive data read by the reading unit wirelessly due to influences from noise and so fail to transmit the data to the mobile terminal.

To avoid such a failure, the mobile terminal, the reading unit and the modular sled may be connected mutually by wire. However, the reading unit has a different shape or different specifications depending on the types of information media to be read, and so the modular sled as the holder to hold the reading unit also has to have a plurality of types corresponding to the types of the reading unit.

Therefore, when the system has to read a plurality of information media and so needs to change the reading unit so as to correspond to the type of the information medium, the reading unit attached to the module sled has to be detached from the mobile terminal, and then another modular sled fitted to the reading unit to be used next has to be attached to the mobile terminal again.

For such detachment and attachment operations, a user is required to handle the system carefully so as not to damage the terminal part of the mobile terminal. Such a work is troublesome, and the user cannot replace the reading units easily. If the terminal part of the mobile terminal is damaged, another fundamental problem may occur that data cannot be received from the reading unit. Therefore the frequency of such detachment and attachment from/to the mobile terminal is preferably as low as possible.

In view of the above problem, the present invention aims to provide a connection unit capable of reducing influences from noise and minimizing the damage of a mobile terminal during the replacement of a reading unit.

A mobile connection unit according to the present invention is configured to intervene between a mobile terminal having a terminal and a reading unit having a terminal, the reading unit being configured to read data from an information medium. The connection unit includes: a main body to be attached to the mobile terminal, the reading unit being attached/detached to/from the main body attached to the mobile terminal; a first terminal disposed at the main body, the first terminal coming in contact with the terminal of the mobile terminal for electrical connection with the mobile terminal; a second terminal disposed at the main body, the second terminal coming in contact with the terminal of the reading unit for electrical connection with the reading unit; and an electrical pathway disposed between the first terminal and the second terminal to connect the mobile terminal and the reading unit.

The connection unit may further include a CPU to manage transmission and reception of the data between the mobile terminal and the reading unit.

The connection unit may further include a memory to record the data transmitted from the reading unit.

An information-processing device according to the present invention includes: a mobile terminal having a terminal; one or more reading units having a terminal, the reading unit being configured to read data from an information medium; and a mobile connection unit configured to intervene between the mobile terminal and the reading unit. The connection unit includes: a main body to be attached to the mobile terminal, the reading unit being attached/detached to/from the main body attached to the mobile terminal; a first terminal disposed at the main body, the first terminal coming in contact with the terminal of the mobile terminal for electrical connection with the mobile terminal; a second terminal disposed at the main body, the second terminal coming in contact with the terminal of the reading unit for electrical connection with the reading unit; and an electrical pathway intervening between the first terminal and the second terminal to connect the mobile terminal and the reading unit.

According to the connection unit of the present invention, the first terminal comes in contact with the terminal of the mobile terminal and the second terminal comes in contact with the terminal of the reading unit for electrical connection between the mobile terminal and the reading unit. Therefore, the connection unit can reduce influences from noise and can avoid reliably a problem of a failure in transmission of data read by the reading unit. According to the present embodiment, the main body of the connection unit is attached to the mobile terminal, to/from which the reading unit is attached/detached. This means that when the reading units are replaced for reading data from a plurality of different types of information media, the reading units can be replaced simply by detaching the reading unit from the connection unit. This can eliminate the attachment and detachment operation at the terminal of the mobile terminal during the replacement of the reading units, and so can minimize the damage of the mobile terminal resulting from such an operation.

In addition to the above advantageous effects, according to the information-processing device of the present invention, even when the connection unit is damaged because of repeated attachment and detachment operations of the reading units, the connection unit only may be renewed. Therefore cost can be saved as compared with the case where the mobile terminal is damaged. As a result, as compared with a conventional system, the information-processing device of the present embodiment can reduce psychological burden on users during replacement of the reading units.

BRIEF DESCRIPTION OF THE DRAWINGS

Referring now to the attached drawings which form a part of this original disclosure.

DETAILED DESCRIPTION OF THE EMBODIMENTS

The following describes embodiments of the present invention in details, with reference to the drawings.

Embodiment 1

Figure 1:
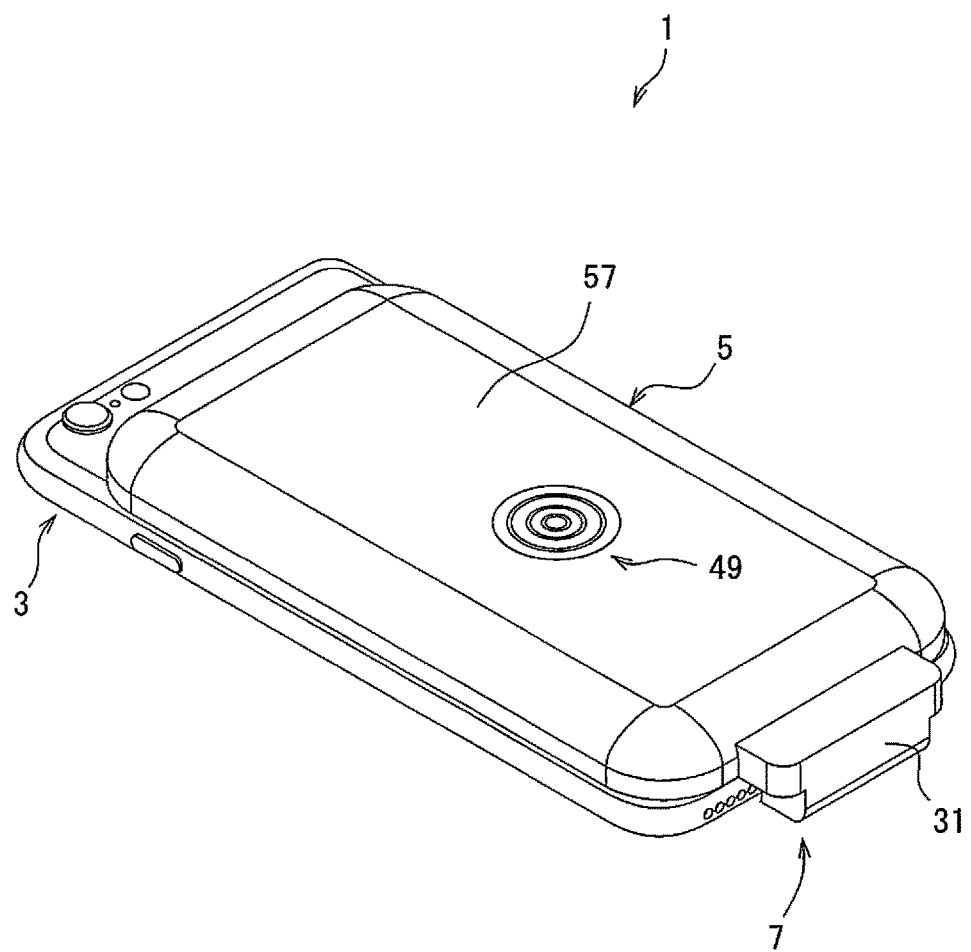
FIG. 1 is a perspective view of an information-processing device according to Embodiment 1.

As shown in FIG. 1, an information-processing device 1 of the present embodiment includes: a smartphone 3 as a mobile terminal; a RFID reader unit (hereinafter called a "RFID unit" with reference numeral 5) as a reading unit; and a connection unit 7.

Figure 2A:
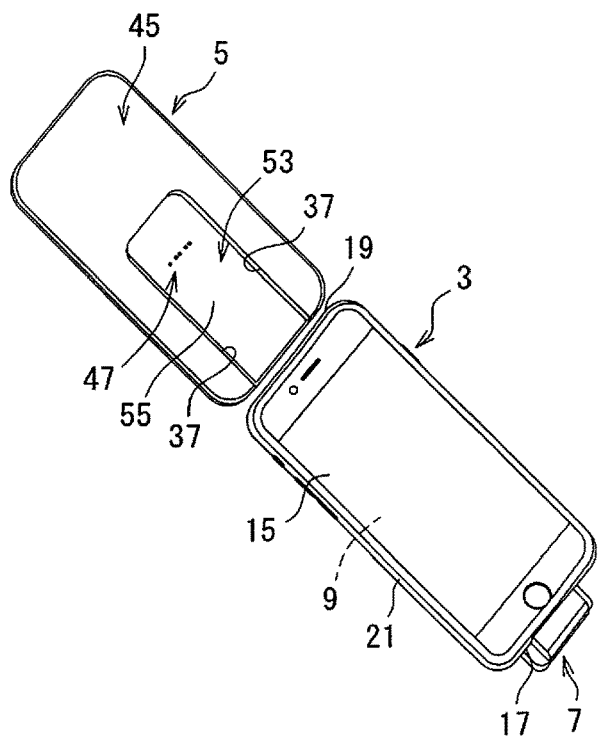
FIG. 2A is a front view of a smartphone, a connection unit, and a RFID unit included in the information-processing device.

As shown in FIG. 2A, the smartphone 3 has a liquid crystal display 9 and a touch panel 15. The smartphone 3 has a female connector 13 (FIG. 4) on the periphery for connection with an external device. In the following description, a principal surface of the smartphone 3 having the liquid crystal display 9 is called a front face, and the principal surface of the smartphone 3 on the other side is called a rear face 11. For the faces on the periphery of the smartphone 3 other than the principal faces, a face having the connector 13 is called a lower face 17, the face opposed to the lower face is called an upper face 19, and the other faces are called lateral faces 21.

The smartphone 3 internally includes a CPU, a memory, a network interface and an interface for connected devices, which are not illustrated. The memory stores a scan application. When the CPU executes the scan application, the CPU requests reading of data from the RFID unit 5, and provides a variety of services based on the data obtained from the RFID unit 5. The interface for connected devices is connected to a data terminal of the connector 13. The connector 13 has a power terminal, and the power terminal is connected to the internal power supply of the smartphone 3.

Figure 2B:
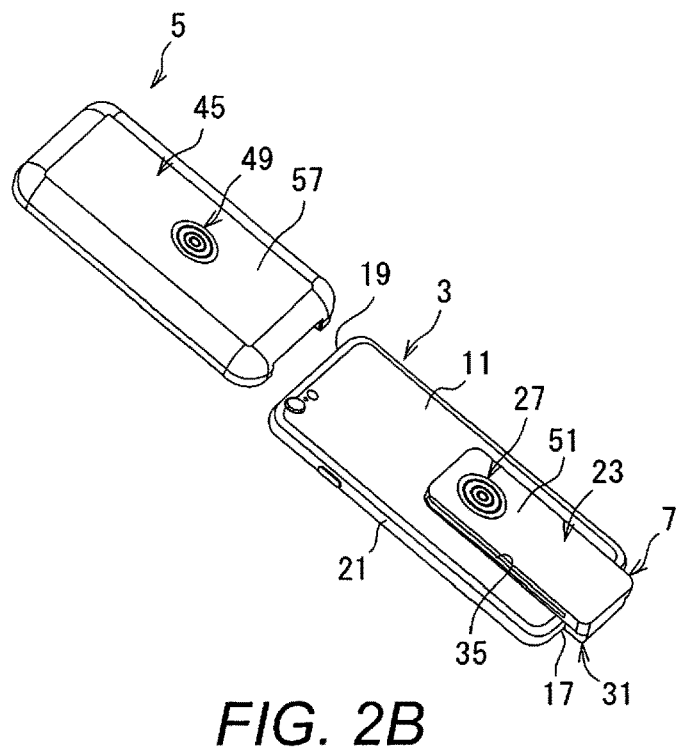
FIG. 2B is a rear view of the smartphone, the connection unit, and the RFID unit included in the information-processing device.
Figure 3:
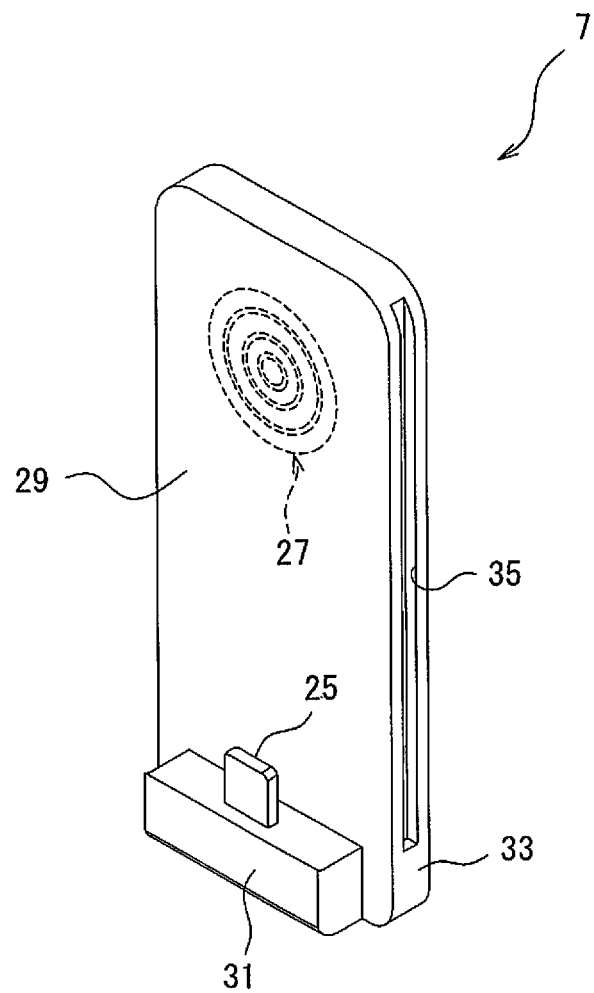
FIG. 3 is a perspective view of the connection unit.

As shown in FIGS. 2A, 2B and 3, the connection unit 7 is a mobile unit that is disposed on the rear face 11 and is attached to the smartphone 3 for integral use with the smartphone 3. The connection unit includes a main body 23; a male connector 25 as a first terminal; and a pattern electrode 27 as a second terminal.

The main body 23 has a rectangular plate part 29 to be disposed along the rear face 11 of the smartphone 3, and an elevated part 31 at the longitudinal one end of the plate part 29, the elevated part protruding in the thickness direction of the plate part 29. The plate part 29 has longitudinal lateral faces 33 on both sides, along each of which an engagement groove 35 is formed longitudinally. These engagement grooves 35 receive engagement projections 37 of the RFID unit 5 when the RFID unit is inserted by sliding. The thus engagement of the engagement grooves 35 with the engagement projections 37 allows the RFID unit 5 to be attached to the connection unit 7. When the RFID unit is slid in the opposite direction of the attachment, the engagement projections 37 are disengaged from the engagement grooves 35, whereby the RFID unit 5 can be removed from the connection unit 7.

The male connector 25 protrudes from the elevated part 31 to be parallel to the principal faces of the plate part 29. The connector 25 has a power terminal and a data terminal, and these terminals are connected to the power terminal and the data terminal of the connector 13 (FIG. 4) of the smartphone 3. The pattern electrode 27 includes a plurality of concentric electrodes each having a certain width, and is disposed on the rear face 51 (on the other side of the face opposed to the smartphone 3) of the plate part 29. The pattern electrode 27 includes an electrode for power and an electrode for data. For such a pattern electrode 27, Magconn (registered trademark) produced by Kotec Co., Ltd. may be typically used.

Figure 4:
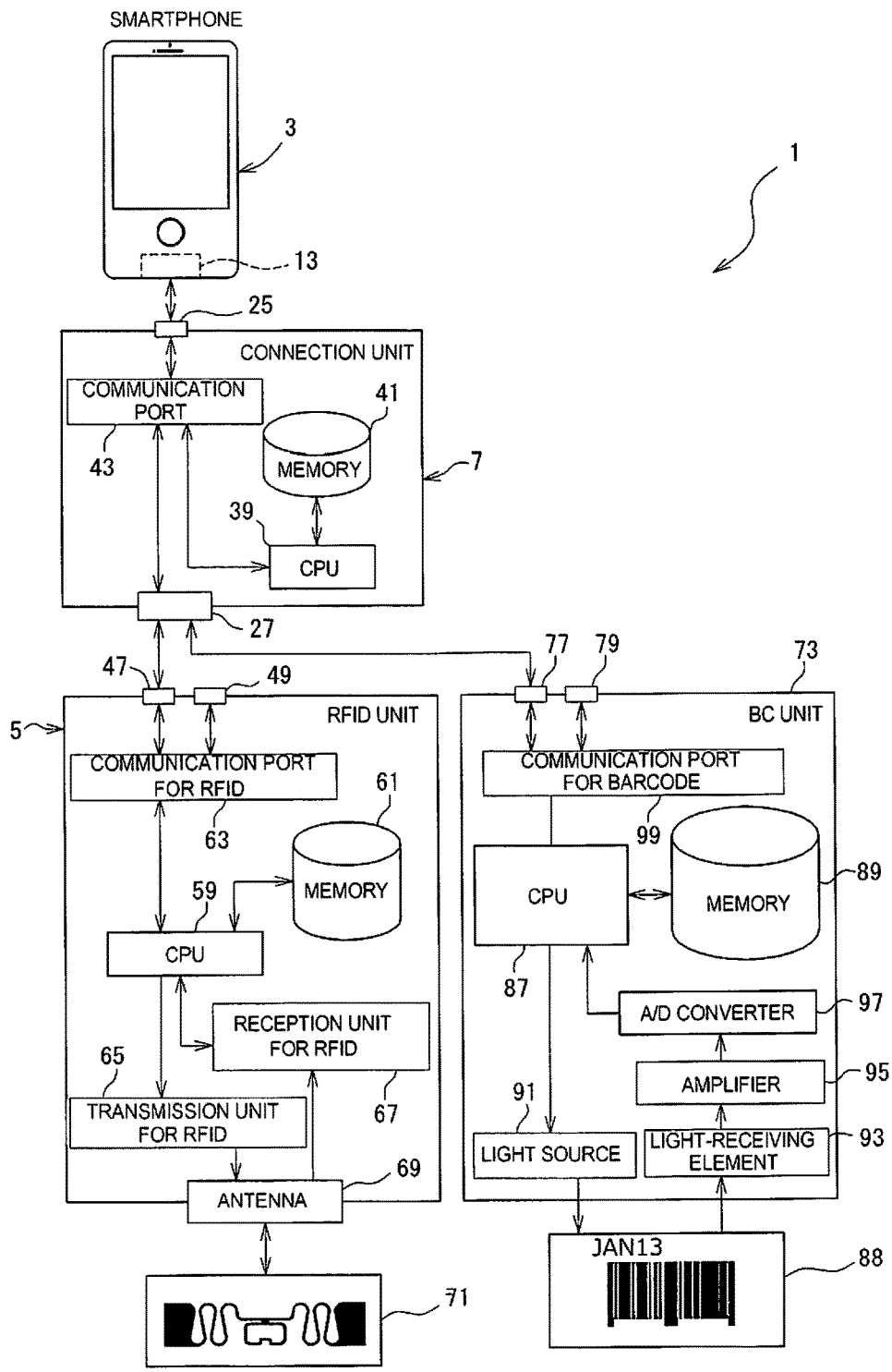
FIG. 4 is a block diagram of the information-processing device.

As shown in FIG. 4, the main body 23 internally includes a microcomputer having a CPU 39, a memory 41 and a communication port 43. This microcomputer is driven by power supplied from the smartphone 3 via the power terminal of the connector 25. The memory 41 stores a program. When the CPU 39 executes this program, the CPU can manage exchange of data between the smartphone 3 and the RFID unit 5 via the communication port 43. The communication port 43 is electrically connected to the data terminal of the connector 25 and to the electrode for data of the pattern electrode 27. The power terminal of the connector 25 and the electrode for power of the pattern electrode 27 are electrically connected. In this way, the connector 25 and the pattern electrode 27 have an electrical pathway formed therebetween, and this electrical pathway connects the smartphone 3 and the RFID unit 5 electrically.

As shown in FIGS. 2A and 2B, the RFID unit 5 is a mobile reading unit that is attached to the connection unit 7 for integral use with the smartphone 3 and the connection unit 7. The RFID unit includes a main body 45; a projecting electrode 47 as a connecting terminal to be connected to the connection unit 7; and a pattern electrode 49 as a connecting terminal to be connected to another reading unit, for example.

The main body 45 is disposed on the rear face 11 of the smartphone 3 and on the rear face 51 of the connection unit 7. The main body has a plate shape having a recess 53, into which the connection unit 7 is to be fitted. This recess 53 has lateral walls, on which the engagement projections 37 are formed for engagement with the engagement grooves 35 of the connection unit 7.

The projecting electrode 47 includes an electrode for power and an electrode for data, and these electrodes project a little from the bottom face 55 of the recess 53. These electrodes are disposed so as to correspond to the electrodes of the pattern electrode 27 of the connection unit 7 in position. For such a projecting electrode 47, Magconn (registered trademark) produced by Kotec Co., Ltd. may be typically used. The pattern electrode 49 includes a plurality of concentric electrodes each having a certain width, and is disposed on the rear face 57 of the main body 45. For this pattern electrode 49, Magconn (registered trademark) may be used similarly to the pattern electrode 27 of the connection unit 7 as stated above.

As shown in FIG. 4, the RFID unit 5 internally includes a microcomputer having a CPU 59, a memory 61, and a communication port for RFID 63, a transmission unit for RFID 65, a reception unit for RFID 67 and an antenna 69. The memory 61 stores a program. When the CPU 59 executes the program, the CPU executes data reading processing described later, and transmits the read data.

When the connector 25 of the connection unit 7 is inserted into the connector 13 of the smartphone 3 as stated above, and then the RFID unit 5 is attached to the connection unit 7, the pattern electrode 27 of the connection unit 7 and the projecting electrode 47 of the RFID unit 5 are connected. As a result, the smartphone 3, the connection unit 7, and the RFID unit 5 can be used integrally and can function as the information-processing device 1. The following describes the operation of this information-processing device 1.

The CPU of the smartphone 3 loads the scan application from the memory for execution. Then, when a user performs a predetermined operation using a GUI to start scanning, for example, the CPU of the smartphone 3 sends a request for data to the RFID unit 5 via the interface for connected devices and the connector 13.

The CPU 39 of the connection unit 7 receives this request via the connector 25 and the communication port 43. Then the CPU 39 transfers the request to the RFID unit 5 via the communication port 43 and the pattern electrode 27.

The CPU 59 of the RFID unit 5 receives this request via the projecting electrode 47 and the communication port for RFID 63. Then the CPU 59 executes the data reading processing. During the reading processing, the CPU 59 controls the transmission unit for RFID 65 to transmit radio waves, for example, from the antenna 69 so as to supply power to a RF tag 71. When the antenna 69 receives reflected waves from the RF tag 71, the CPU 59 controls the reception unit for RFID 67 to acquire data included in the reflected waves. Then the CPU 59 transmits the acquired data to the connection unit 7 via the communication port for RFID 63 and the projecting electrode 47.

The CPU 39 of the connection unit 7 acquires the data via the pattern electrode 27 and the communication port 43, and transfers the data to the smartphone 3 via the communication port 43 and the connector 25.

When receiving the data from the connection unit 7 via the connector 13 and the interface for connected device, the CPU of the smartphone 3 provides a service based on the data.

Figure 5A:
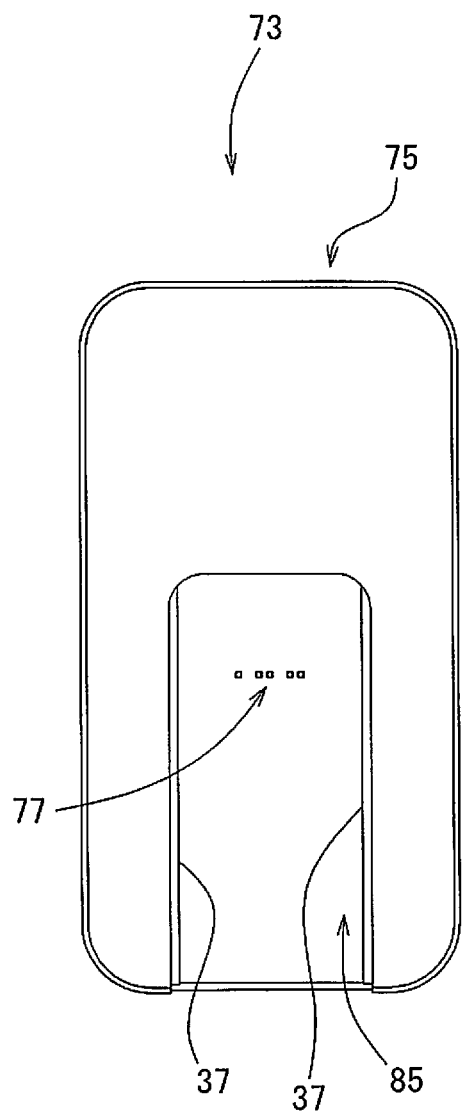
FIG. 5A is a front view of a BC unit.
Figure 5B:
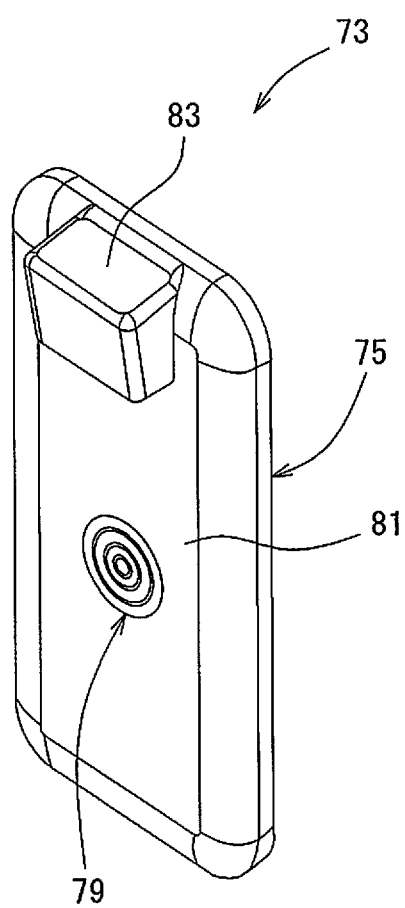
FIG. 5B is a perspective view of the BC unit.

The information-processing device 1 may include a barcode reader unit (hereinafter called a "BC unit" with reference number 73) shown in FIGS. 5A and 5B for operation, instead of the RFID unit 5.

The BC unit 73 is a mobile reading unit that is attached to the connection unit 7 for integral use with the smartphone 3 and the connection unit 7. The BC unit includes a main body 75; a projecting electrode 77 as a connecting terminal to be connected to the connection unit 7; and a pattern electrode 79 as a connecting terminal to be connected to another reading unit.

The main body 75 includes a plate part 81 and a bay-window part 83. The plate part 81 is disposed on the rear face 11 of the smartphone 3 and on the rear face 51 of the connection unit 7. The plate part 81 is rectangular, and has a recess 85 from its longitudinal one end to a center part. Similarly to the RFID unit 5, this recess 85 is to fit the connection unit 7 and has engagement projections 37 for engagement with the engagement grooves 35 of the connection unit 7. The bay-window part 83 is a window to output light for scanning over a barcode 88 (FIG. 4) and receive the reflected light. The bay-window part is disposed on the plate part 81 at a part corresponding to the upper face 19 of the smartphone 3. For the projecting electrode 77 and the pattern electrode 79, those similar to the RFID unit 5 may be used.

As shown in FIG. 4, the main body 75 internally includes a microcomputer having a CPU 87, a memory 89, and a communication port for barcode 99, a light source 91, a light-receiving element 93, an amplifier 95, and an A/D converter 97. The memory 89 stores a program beforehand. When the CPU 87 executes this program, the CPU executes data reading processing.

The data reading processing starts with the reception by the CPU 87 of a request transferred from the connection unit 7. When receiving the request, the CPU 87 controls the light source 91 to emit light. This leads to irradiation of the barcode 88 with the light from the bay-window part 83. When the light-receiving element 93 receives the reflected light from the bay-window part 83, the light-receiving element 93 outputs an analog signal. This analog signal is input to the A/D converter 97 controlled by the CPU 87, and the A/D converter converts the analog signal to a digital signal. The CPU 87 acquires data assigned to the barcode based on this digital signal.

When acquiring the data, the CPU 87 transmits the data to the connection unit 7 via the communication port for barcode 99 and the projecting electrode 77.

According to the connection unit 7 of the present embodiment, the connector 25 comes in contact with the connector 13 of the smartphone 3, and the pattern electrode 27 comes in contact with the terminal 47, 77 of the reading unit, such as the RFID unit 5 or the BC unit 73 for electrical connection between the smartphone 3 and the reading unit. Therefore, the connection unit can reduce influences from noise and can avoid reliably a problem of a failure in transmission of data read by the reading unit.

According to the present embodiment, the connection unit 7 is attached to the smartphone 3, to/from which the reading unit is attached/detached. This means that when the reading units are replaced for reading data from a plurality of different types of information media, the reading units can be replaced simply by detaching the reading unit from the connection unit 7. This can eliminate the attachment and detachment operation at the terminal of the smartphone 3 during the replacement of the reading units, and so can minimize the damage of the smartphone 3 resulting from such an operation.

In addition to the above advantageous effects, according to the information-processing device 1 of the present embodiment, even when the connection unit 7 is damaged because of repeated attachment and detachment operations of the reading units, the connection unit 7 only may be renewed. Therefore cost can be saved as compared with the case where the smartphone 3 is damaged. As a result, as compared with a conventional system, the information-processing device of the present embodiment can reduce psychological burden on users during replacement of the reading units.

The present embodiment is not limited to the above-stated modes. The following describes modified examples of the present embodiment.

Modified Example 1

The mobile terminal is not limited to the smartphone 3, which may be a tablet PC.

Modified Example 2

The configuration of the RFID unit 5 is not limited to the above. For instance, when the RF tag has its own battery and transmits a signal periodically, the RFID unit 5 may not have the transmission unit for RFID 65. Instead of driving the RFID unit 5 by power obtained from the connection unit 7 via the power terminal of the projecting electrode 47, the RFID unit may include a battery in the main body 45, and may be driven by power supplied from the battery. A switch (not illustrated) to switch between ON/OFF of the power supply of the RFID unit 5 may be provided separately.

Modified Example 3

The configuration of the BC unit 73 also is not limited to the above. For instance, the BC unit may be configured to read a barcode by means of a CCD (Charge-Coupled Device) image sensor, or may be configured to apply laser to a barcode and receive reflected light with a light-receiving element. Instead of driving the BC unit 73 by power obtained from the connection unit 7 via the power terminal of the projecting electrode 77, the BC unit may include a battery in the main body 75, and may be driven by power supplied from the battery. A switch (not illustrated) to switch between ON/OFF of the power supply of the BC unit 73 may be provided separately.

Modified Example 4

The RFID unit 5 and the BC unit 73 may include a switch (not illustrated) to input a signal to the CPUs 59 and 87, respectively, to instruct reading of data. In this case, when the CPU 59, 87 receives an input from the switch, the CPU executes the reading processing and transmits the read data to the connection unit 7. Then, when receiving the data from the RFID unit 5 or the BC unit 73, the CPU 39 of the connection unit 7 stores the received data in the memory 41 until the CPU receives a request from the mobile terminal. When receiving the request from the mobile terminal, the CPU of the connection unit 7 reads the data from the memory and transmits the data to the mobile terminal.

Such an information-processing device including the RFID unit 5 or the BC unit 73 and the connection unit 7 can continue the reading processing in response to inputting with the switch even when the scan application is interrupted because of a phone call coming during the reading processing, for example, and can store the read data in the memory of the connection unit 7. After the interruption of the scan application ends, the mobile terminal can acquire the stored data at one time. In this way, the information-processing device can improve the user friendliness.

Modified Example 5

Other reading units, such as a card reader unit to read data stored in an IC card and a biometric authentication unit for biometric authentication, may be used in addition to the RFID unit 5 and the BC unit 73. In this way, the reading units can be changed as needed in accordance with information media to be read.

Modified Example 6

The mechanism to attach or detach the reading unit and the connection unit 7 is not limited to the above-stated mode using the engagement projections 37 and the engagement grooves 35. For instance, magnets may be disposed at the joining parts of both units so as to attach the reading unit to the connection unit 7 by a magnetic force of the magnets.

Modified Example 7

The connecting terminals for the reading unit and the connection unit 7 are not limited to the above-stated mode through a contact between the projecting electrodes 47, 77 and the pattern electrode 27. Another connector may be used, for example, so as to correspond to the mechanism to attach or detach the reading unit and the connection unit 7.

Embodiment 2

The following describes Embodiment 2 of the present invention. Like reference numerals designate like parts of Embodiment 1, and their description is omitted.

Figure 6:
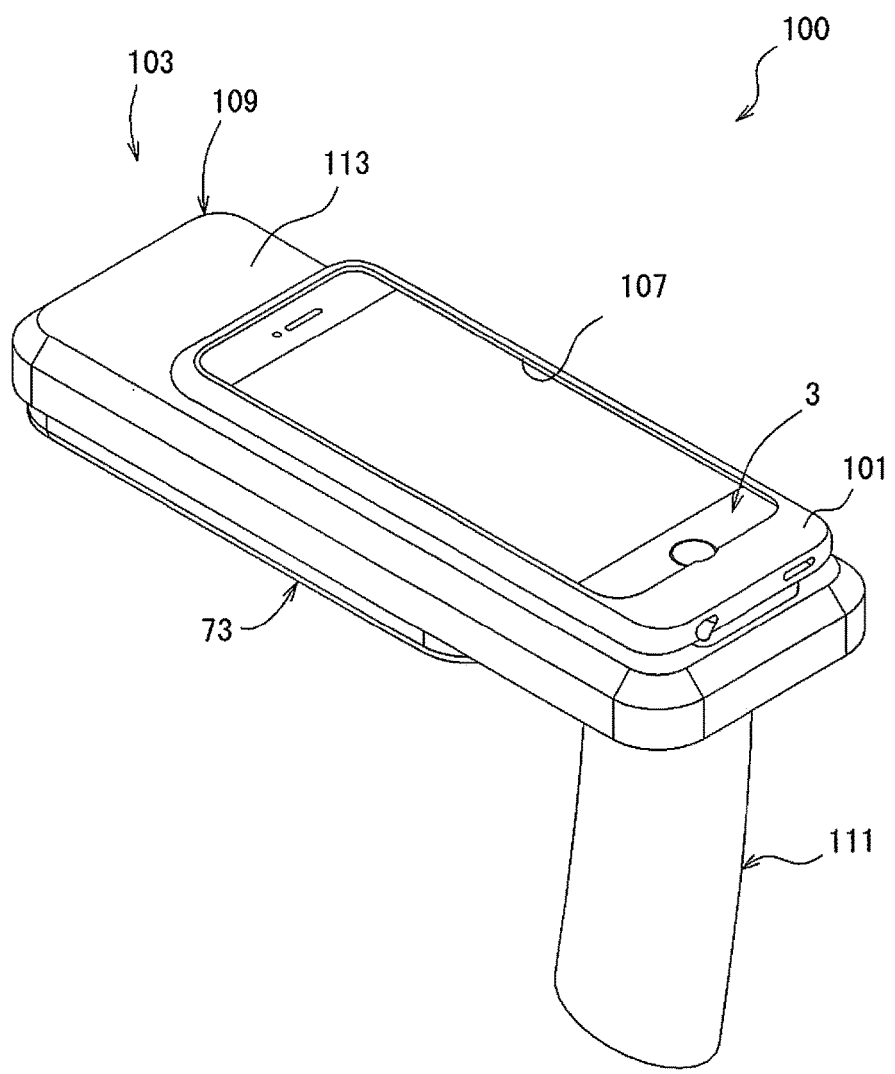
FIG. 6 is a perspective view of an information-processing device according to Embodiment 2.
Figure 7:
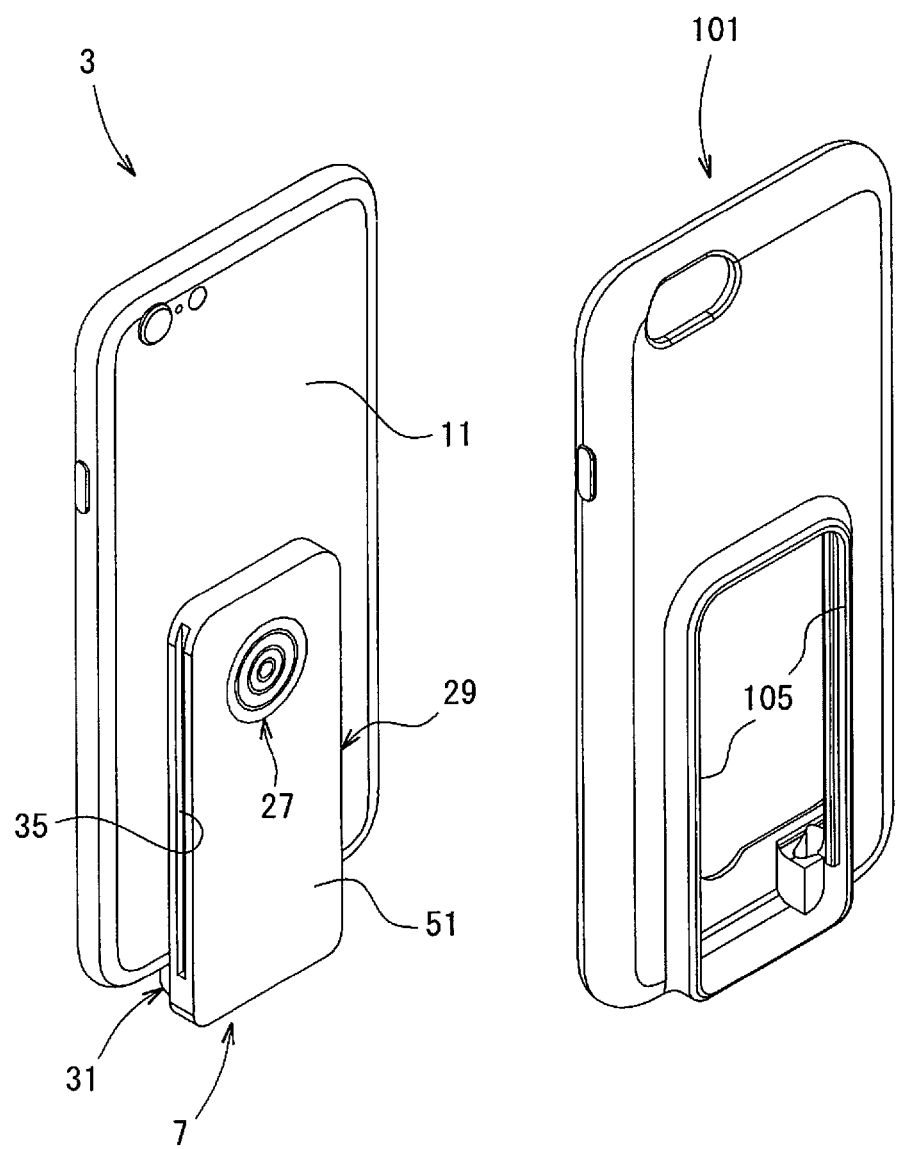
FIG. 7 is a perspective view of a smartphone, a connection unit, and a protective cover included in the information-processing device.

As shown in FIGS. 6 and 7, an information-processing device 100 of the present embodiment includes: a smartphone 3 and a connection unit 7 that are integrated with a protective cover 101; a RFID unit 103, and a BC unit 73.

The protective cover 101 is made of an elastic material, such as silicon. In the present embodiment, the protective cover is attached to the smartphone 3 and the connection unit 7 that are mutually connected. The protective cover 101 covers the peripheral faces and the rear face 11 of the smartphone 3. The protective cover 101 covers the elevated part 31 and the peripheral faces of the plate part 29 of the connection unit 7. The protective cover 101 has a hole 105 to expose the rear face 51 as a whole of the plate part 29 of the connection unit 7 and a hole 107 to expose the liquid crystal display 9.

The RFID unit 103 has a shape like a gun, and includes a plate part 109 on which the smartphone 3 and the connection unit 7 that are integrated with the protective cover 101 is placed, and a grip 111 extending from the plate part 109 substantially perpendicularly.

Figure 8:
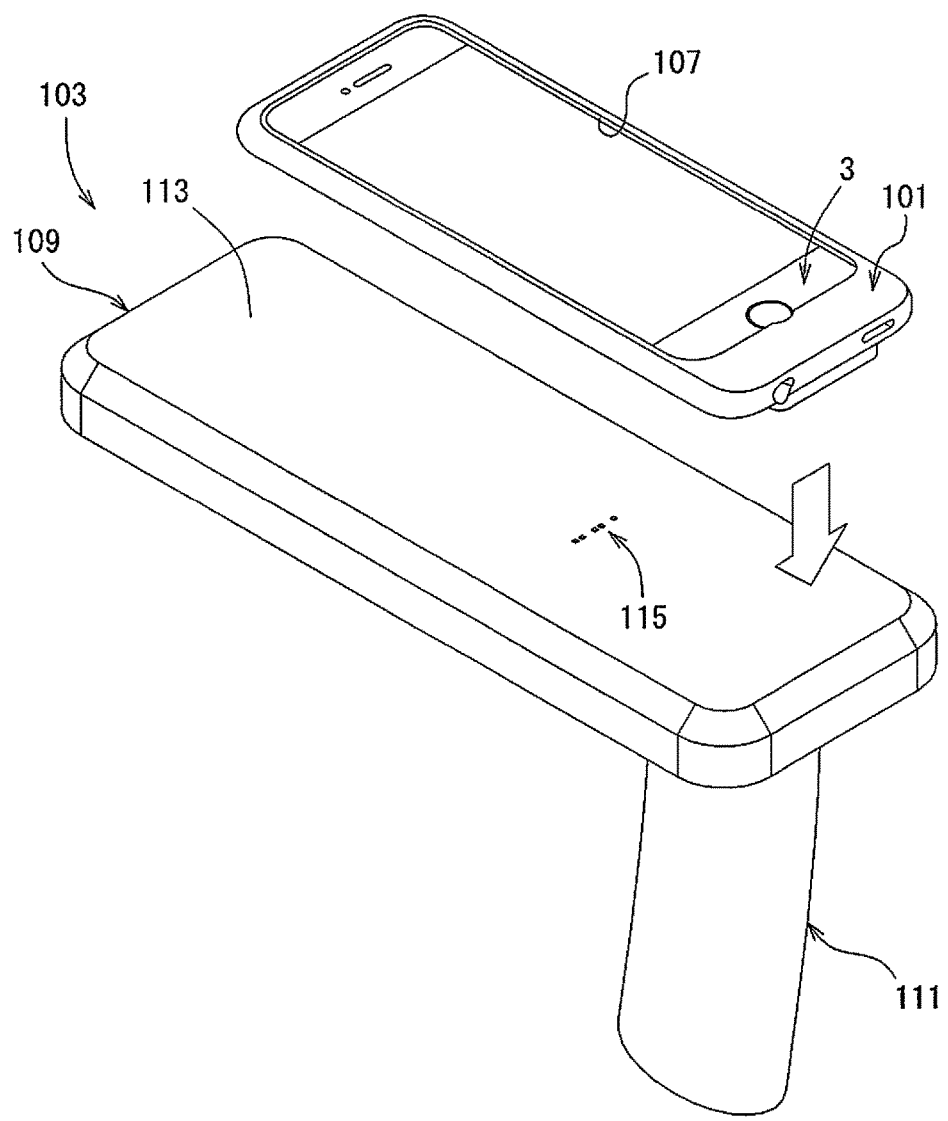
FIG. 8 is a mode of connecting the smartphone and the connection unit with the RFID unit.

As shown in FIG. 8, the mounting face 113 of the plate part 109 has a projecting electrode 115 as a connecting terminal. When the connection unit 7 is placed on the plate part 109, this projecting electrode 115 connects to the pattern electrode 27 (FIG. 7) of the connection unit. The projecting electrode 115 and the pattern electrode 27 internally include magnets. With this configuration, the smartphone 3 and the connection unit 7 that are integrated are attached to the plate part 109 by the attractive force of the magnets.

Figure 9:
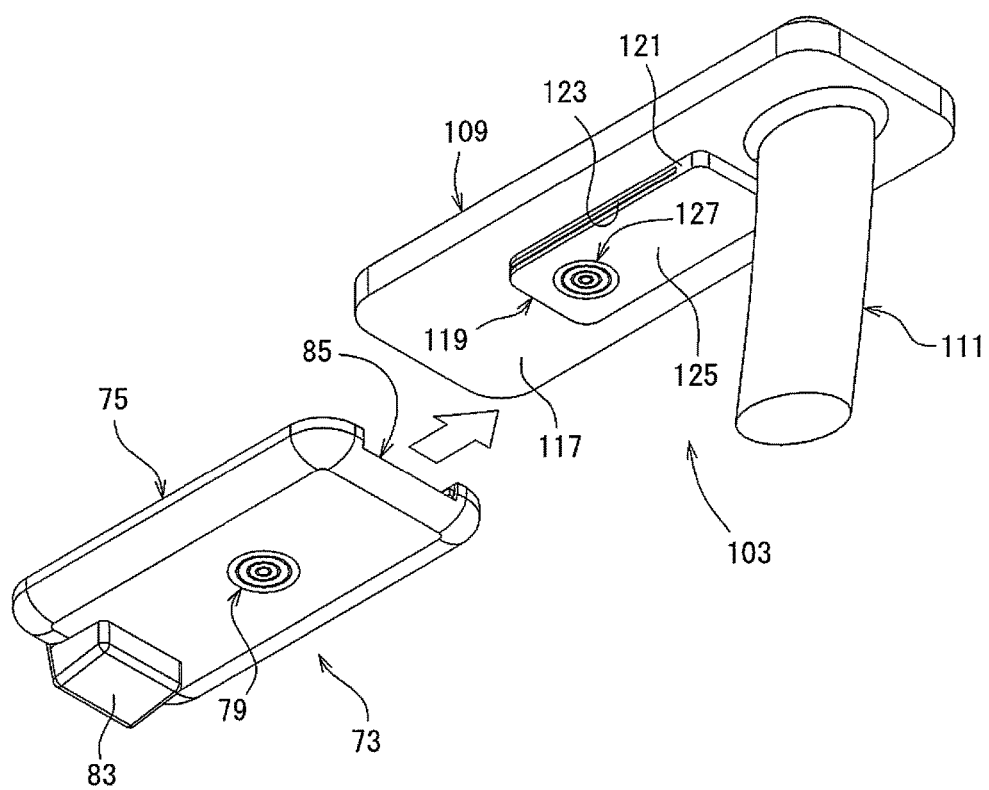
FIG. 9 is a mode of connecting the BC unit with the RFID unit.

As shown in FIG. 9, the lower face 117 (on the other side of the mounting face 113) of the plate part 109 has a plate-like projection 119, to which the recess 85 of the BC unit 73 is to be fitted. The projection 119 has lateral faces 121, on each of which an engagement groove 123 is formed. Into these engagement grooves, the engagement projections 37 (FIG. 5A) of the BC unit 73 are inserted by sliding. The projection 119 has a principal face 125, and the principal face includes a pattern electrode 127 for connection with the projecting electrode 77 (FIG. 5A) of the BC unit 73.

Figure 10:
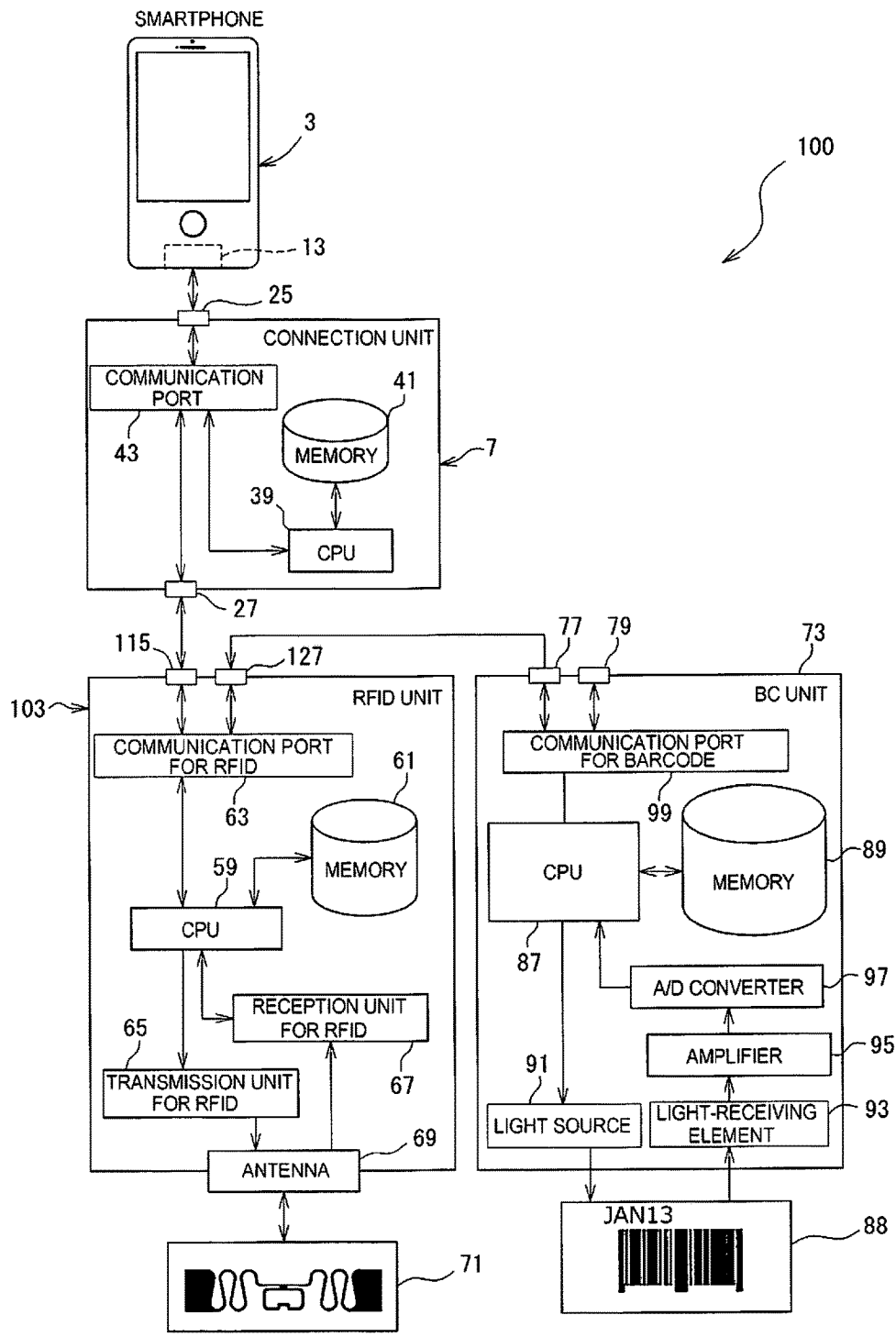
FIG. 10 is a block diagram of the information-processing device.

The integrated smartphone 3 and connection unit 7 is placed on such a RFID unit 103, to which the BC unit 73 is fitted, whereby the information-processing device 100 can be configured. The following describes the operation of this information-processing device 100, with reference to FIG. 10.

Firstly the CPU of the smartphone 3 sends a request for data to the RFID unit 103 or the BC unit 73.

The CPU 39 of the connection unit 7 receives this request via the connector 25 and the communication port 43. Then the CPU 39 transfers the request to the RFID unit 103 via the communication port 43 and the pattern electrode 27.

The CPU 59 of the RFID unit 103 receives the request via the projecting electrode 115 and the communication port for RFID 63. When the received request includes a request for the RFID unit 103, then the CPU 59 executes data reading processing and transmits the acquired data to the connection unit 7 via the communication port for RFID 63 and the projecting electrode 115. When the received request includes a request for the BC unit 73, then the CPU 59 transfers the request to the BC unit 73 via the communication port for RFID 63 and the pattern electrode 127.

The CPU 87 of the BC unit 73 receives the request via the projecting electrode 77 and the communication port for barcode 99. When the received request includes a request for the BC unit 73, then the CPU 87 executes data reading processing, and transmits the acquired data to the RFID unit 103 via the communication port for barcode 99 and the projecting electrode 77.

The CPU 59 of the RFID unit 103 receives the data via the pattern electrode 127 and the communication port for RFID 63. Then the CPU 59 transfers the data to the connection unit 7 via the communication port for RFID 63 and the projecting electrode 115.

The CPU 39 of the connection unit 7 receives the data via the pattern electrode 27 and the communication port 43. The CPU 39 transfers the received data to the smartphone 3 via the communication port 43 and the connector 25. In this way, the CPU of the smartphone 3 provides a service based on the data.

According to the information-processing device 100 of the present embodiment, a user can handle a plurality of reading units (the RFID unit 103 and the BC unit 73) integrally, and so the information-processing device is convenient for the user because the user does not need to replace the reading units depending on the types of information media.

Since the RFID unit 103 includes the grip 111, the user can easily handle the information-processing device when reading data from many information media. In this way, a very user-friendly information-processing device 100 can be provided.

The protective cover 101 can avoid damage of the smartphone 3. The material of the protective cover 101 is not limited to the above, and a hard material, such as plastic, may be used, for example. The protective cover may have a hole as needed for an earphone terminal of the smartphone 3, for example.

The present invention may be embodied in various modes through improvement, changes and modifications based on the knowledge of those skilled in the art without departing from the scope of the present invention. The scope of the present invention covers all of these modes. The present invention may be modified variously without departing from the scope thereof.

The invention claimed is:

1. A mobile connection unit configured to connect a mobile terminal having a first terminal and a mobile reading unit having a second terminal, the reading unit being configured to read data from an information medium, the connection unit comprising:
   a first terminal portion configured to contact the first terminal of the mobile terminal for electrical connection with the mobile terminal;
   a second terminal portion configured to contact the second terminal of the reading unit for electrical connection with the reading unit;
   an electrical pathway disposed between the first terminal portion and the second terminal portion to connect the mobile terminal and the reading unit, and
   a main body configured to be attached to a rear face side of the mobile terminal, the reading unit being attached to and detached from the main body in a state in which the main body is attached to the rear face side of the mobile terminal,
   the main body being smaller than the mobile terminal in size,
   the main body including a first body portion where the first terminal portion is disposed and a second body portion, other than the first body portion, where the second terminal portion is disposed, and
   the main body being disposed between the mobile terminal and the reading unit with being sandwiched therebetween when the reading unit is attached to the main body in a state in which the main body is attached to the rear face side of the mobile terminal so that the second body portion is hidden behind the rear face of the mobile terminal.

2. The connection unit according to claim 1, wherein the main body includes a magnet, and
   the magnet attaches the reading unit to the main body.

3. The connection unit according to claim 1, wherein the main body is further configured to be attached to and detached from the reading unit by sliding.

4. The connection unit according to claim 1, wherein the second terminal portion includes a plurality of concentric electrodes.

5. The connection unit according to claim 1, wherein the main body is smaller than the reading unit in size,
   the second body portion of the main body has a first face opposed to the mobile terminal and a second face on the other side of the first face, and
   the second terminal portion is disposed on the second face.

6. An information-processing device, comprising:
   a mobile terminal having a first terminal;
   at least one mobile reading unit having a second terminal, the reading unit being configured to read data from an information medium; and a mobile connection unit configured to connect the mobile terminal and the reading unit, the connection unit including a first terminal portion configured to contact the first terminal of the mobile terminal for electrical connection with the mobile terminal, a second terminal portion configured to contact the second terminal of the reading unit for electrical connection with the reading unit, an electrical pathway disposed between the first terminal portion and the second terminal portion to connect the mobile terminal and the reading unit, and a main body configured to be attached to a rear face side of the mobile terminal, the reading unit being attached to and detached from the main body in a state in which the main body is attached to the rear face side of the mobile terminal, the main body being smaller than the mobile terminal in size, the main body including a first body portion where the first terminal portion is disposed and a second body portion, other than the first body portion, where the second terminal portion is disposed, and the main body being disposed between the mobile terminal and the reading unit with being sandwiched therebetween when the reading unit is attached to the main body in a state in which the main body is attached to the rear face side of the mobile terminal so that the second body portion is hidden behind the rear face of the mobile terminal.

* * * * *